United States Patent
Oates et al.

(10) Patent No.: US 6,698,081 B2
(45) Date of Patent: Mar. 2, 2004

(54) METHOD OF ATTACHING A PLATE TO A ROD

(75) Inventors: John M. Oates, Allen Park, MI (US); Lester B. Lodrick, Hazel Park, MI (US)

(73) Assignee: Progressive Stamping Company, Inc., Royal Oak, MI (US)

(*) Notice: Subject to any disclaimer, the term of this patent is extended or adjusted under 35 U.S.C. 154(b) by 0 days.

(21) Appl. No.: 10/442,421

(22) Filed: May 21, 2003

(65) Prior Publication Data

US 2003/0198531 A1 Oct. 23, 2003

Related U.S. Application Data

(62) Division of application No. 09/909,259, filed on Jul. 19, 2001, now abandoned.
(60) Provisional application No. 60/263,269, filed on Jan. 22, 2001.

(51) Int. Cl.[7] .............................................. B21D 39/00
(52) U.S. Cl. ............................ 29/512; 29/509; 29/523
(58) Field of Search .......................... 29/512, 523, 513, 29/509, 798, 432.2, 890.044; 285/382.4; 403/277, 280; 72/370.06, 370.07, 370.03

(56) References Cited

U.S. PATENT DOCUMENTS

| | | | | |
|---|---|---|---|---|
| 1,511,822 A | * | 10/1924 | Belcher | 29/509 |
| 1,872,616 A | * | 8/1932 | Andren | 29/512 |
| 3,039,798 A | * | 6/1962 | Carlson et al. | 29/509 |
| 3,319,324 A | * | 5/1967 | Keller | 29/513 |
| 3,496,980 A | * | 2/1970 | Steward et al. | 411/112 |
| 4,233,726 A | * | 11/1980 | Williams | 29/512 |
| 4,245,960 A | * | 1/1981 | Matthews | 416/244 R |
| 4,543,701 A | * | 10/1985 | Muller | 29/432.1 |
| 4,652,169 A | * | 3/1987 | Matthews | 29/512 |
| 4,924,584 A | * | 5/1990 | Harney | 29/509 |
| 5,090,834 A | * | 2/1992 | Yamamoto | 403/277 |
| 5,345,674 A | * | 9/1994 | Knecht et al. | 29/890.044 |
| 5,365,654 A | * | 11/1994 | Moulton | 29/512 |
| 5,489,176 A | * | 2/1996 | Fultz | 411/181 |
| 5,690,459 A | * | 11/1997 | Donovan et al. | 29/509 |
| 5,868,535 A | * | 2/1999 | Ladouceur | 411/181 |
| 5,901,784 A | * | 5/1999 | Potier | 29/890.044 |
| 5,934,851 A | * | 8/1999 | Stewart et al. | 411/183 |
| 6,220,802 B1 | * | 4/2001 | Clarke | 411/63 |
| 6,406,237 B1 | * | 6/2002 | Wojciechowski et al. | 411/107 |
| 6,572,153 B2 | * | 6/2003 | Tatsuta et al. | 285/382.4 |

* cited by examiner

Primary Examiner—David P. Bryant
(74) Attorney, Agent, or Firm—Howard & Howard

(57) ABSTRACT

A method of securely attaching a plate to a malleable metal rod includes forming an integral, generally annular projection on one end of the rod. An opening through the plate is configured to receive the annual projection on the rod. The annual projection is inserted through the opening in the plate and is permanently deformed radially outwardly to overlie and contact the plate at a plurality of spaced locations. The deformations in the annular projection securely attach the plate to the rod.

6 Claims, 4 Drawing Sheets

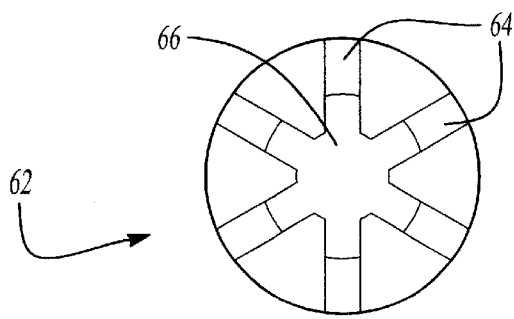
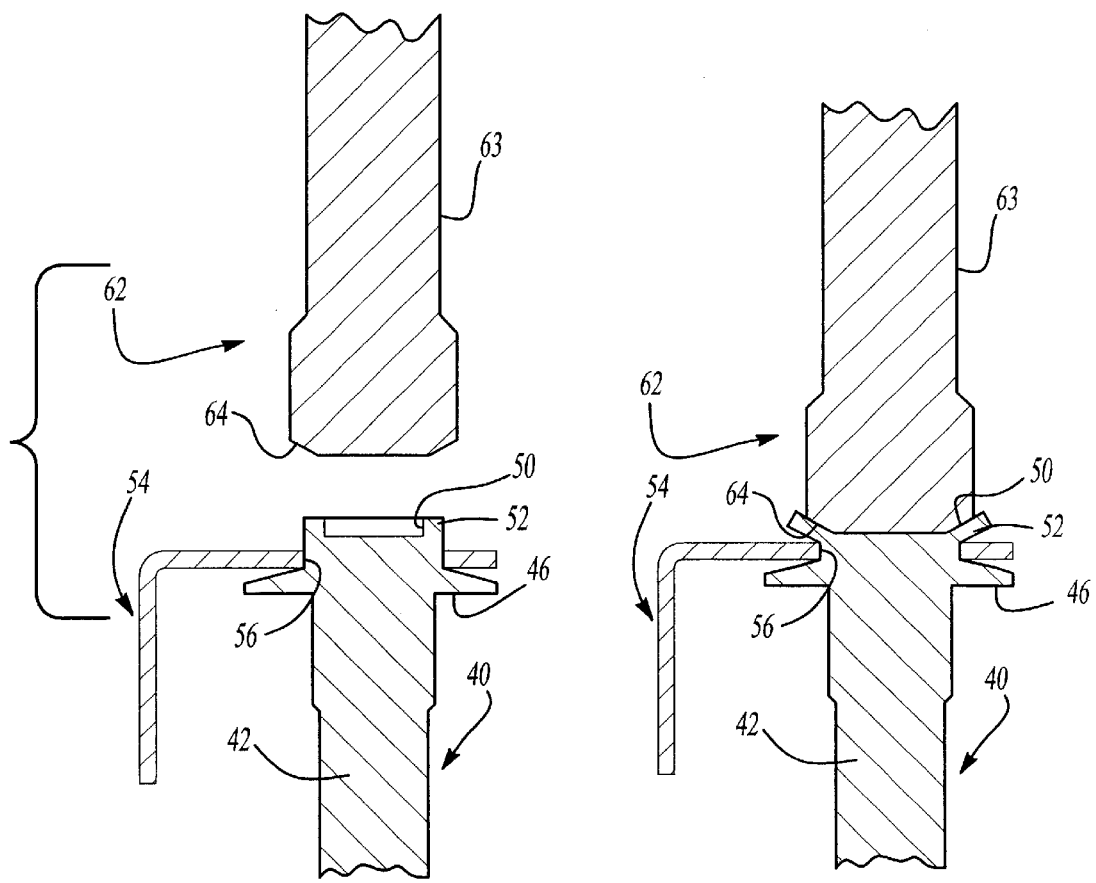
Fig-9
Fig-10
Fig-11

METHOD OF ATTACHING A PLATE TO A ROD

RELATED APPLICATIONS

This application claims priority to U.S. Provisional Application Ser. No. 60/263,269, filed Jan. 22, 2001 and this application is a divisional application of Ser. No. 09/909,259, filed Jul. 19, 2001, now abandoned.

BACKGROUND OF THE INVENTION

This invention relates to a method of securely attaching a plate, such as an anti-rotation plate or flag, to a metal rod, such as a bolt or stud.

Anti-rotation retainers or flags are typically attached to a flange head bolt by staking the corners of the bolt head. Anti-rotation retainers or flags are used in many mass production applications, including automotive applications, to prevent rotation of a bolt during threading of a nut on the threaded end of the bolt using a power wrench. The bolt 20 typically includes a shank portion 22, which may be threaded as shown in FIG. 1 at 24. The bolt also includes an integral radial flange portion 26 and a polygonal head 28. The anti-rotation retainer or flag 30 typically includes a polygonal opening 32 configured to receive the polygonal head 28 of the bolt and the corners of the bolt head are staked, forming small integral projections 34 which overlie the plate 30. That is, the corners of the polygonal head 28 of the bolt are shaved from the free end 29 of the bolt toward the plate 30 and the small projections 34 retain the plate to the bolt.

However, there has been a longstanding problem with this method of securement. The projections 34 are relatively fragile because only the portion of the projections adjacent the plate is integral with the bolt head 28. These projections 34 often break during staking and during handling prior to and during assembly of the bolt in its final application, such as the assembly of a vehicle suspension control arm.

As stated above, the purpose of the anti-rotation retainer or flag is to prevent rotation of the bolt during threading of a nut (not shown) on the bolt using a power wrench. The anti-rotation retainer or flag 30 serves as a wrench during assembly of a nut on the bolt. The flag 30 may include a bent tab 36 which is received between the components of the assembly or in a hole provided in one of the components to be assembled. Thus, the anti-rotation retainer or flag eliminates the requirement of someone holding the bolt with a wrench as a nut is threaded onto the threaded end 24 of the bolt.

For this reason, bolts having an anti-rotation retainer are used extensively by many industries, including the automotive industry, to reduce labor costs during assembly.

However, as stated above, the small staked projections 34 often break off and the anti-rotation retainers become loose or commonly fall off prior to and during assembly of the bolt in its final application. The bolt is then useless where an anti-rotation means is required and discarded. Thus, there has been a longstanding need for a method of securely attaching a plate, such as an anti-rotation retainer, to the head of a flanged bolt which eliminates the problems associated with external staking of the bolt head to the plate by the present method(s).

SUMMARY OF THE INVENTION

The method of securely attaching a plate, such as an anti-rotation retainer or flag, to a rod, such as a conventional flange head bolt, of this invention eliminates the problems associated with conventional staking. The resultant rod and plate assembly of this invention is generally stronger than the plate. That is, the push-off force required to remove the plate from the bolt head is generally stronger than the plate, eliminating the problems associated with the prior art described above.

The method of attaching a plate to a malleable metal rod of this invention includes forming an integral annular projection on the head of the rod or flange head bolt. The annular projection is preferably polygonal and most preferably includes a central recess surrounded by a polygonal annular wall. The method then includes forming an opening through the plate configured to receive the integral annular projection on the rod, inserting the annular projection of the rod through the opening in the plate, and permanently deforming the annular projection on the rod radially outwardly to overlie and preferably contact the plate at a plurality of spaced locations, permanently attaching the plate to the rod.

In the most preferred embodiment of the method of attaching a plate to a rod of this invention, the method includes deforming the polygonal annular projection on the rod at the corners of the polygonal projection using a die member having a plurality of spaced radial projections which engage the internal surfaces of the corner portions of the polygonal annular wall radially outwardly to overlie and contact the plate forming a very secure assembly. In the most preferred method of this invention, the die member includes a plurality of spaced generally conical projections angling downwardly from the axis of the die member which deform an inside surface of the annular projection radially outwardly at an angle relative to the axis of the rod, forming a plurality of integral ribs which angle outwardly to overlie and preferably contact the plate.

The rod and plate assembly of this invention therefore includes a rod having a radial flange portion, a head portion and an integral annular polygonal projection having polygonal side walls surrounding a central recess or pocket which extends from the flange portion, a plate having a polygonal opening therethrough which is received on the polygonal projection, and the integral polygonal projection is deformed radially outwardly to overlie and preferably contact the plate at a plurality of spaced locations, preferably at the corners of the polygonal projection. In the most preferred embodiment, the projections extend radially at an angle relative to the axis of the rod, most preferably at an acute angle.

The method of securely attaching a plate to a metal rod and rod and plate assembly of this invention thus solves the problems associated with the prior method of staking described above, eliminating loss of anti-rotation retainers and thereby reducing cost. Further, the size of the bolt head may be reduced, reducing the weight of the assembly and cost. Finally, the plate and rod assembly of this invention reduces manufacturing cost as discussed further below.

BRIEF DESCRIPTION OF THE DRAWINGS

FIG. 9 is a bottom view of the inventive die member;

FIGS. 10 and 11 illustrate the movement of the inventive die member and the formation of the flange bolt.

DETAILED DESCRIPTION OF THE PREFERRED EMBODIMENTS

Figures 1, 2, 3:
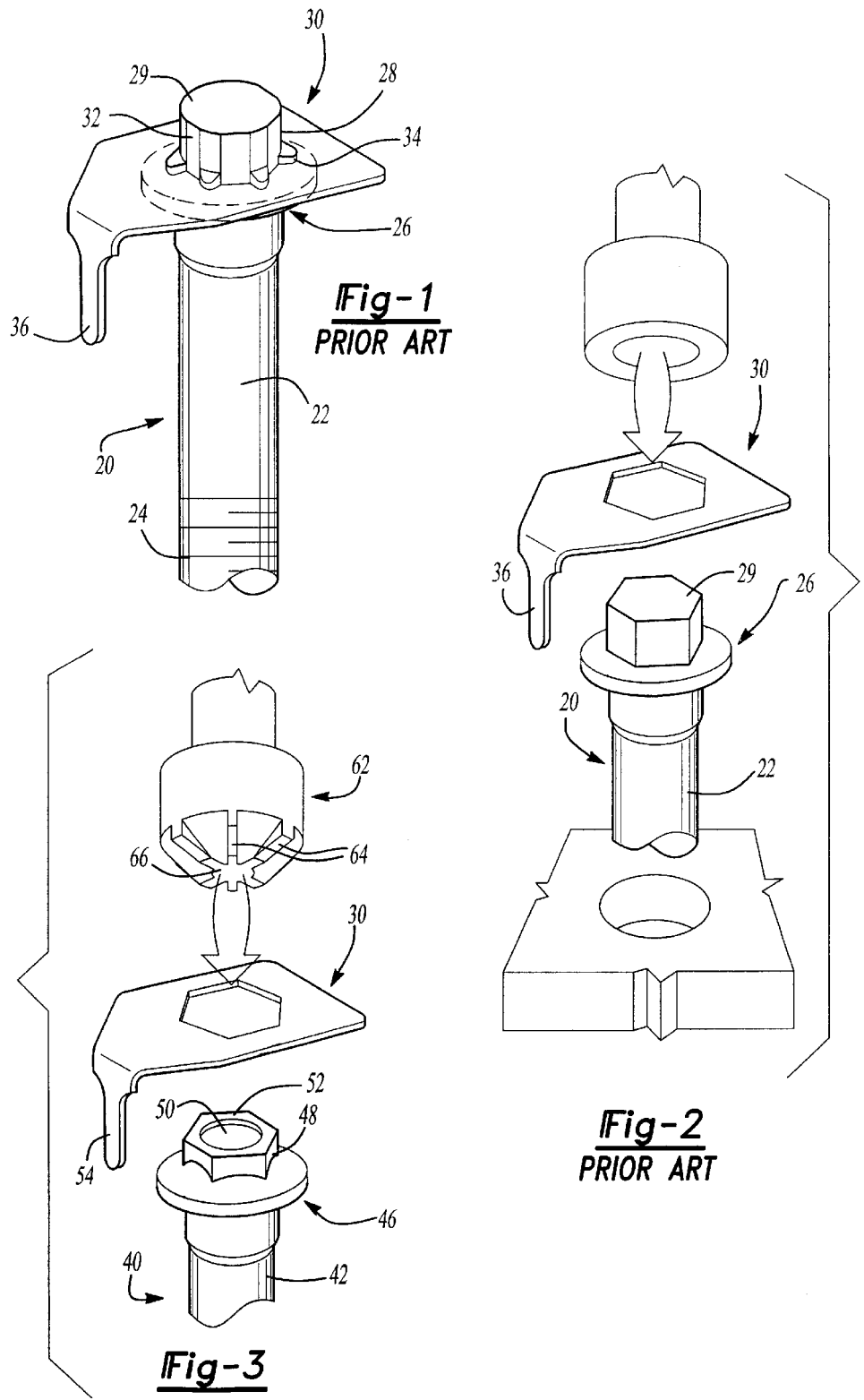
FIG. 1 illustrates a prior art stud and anti-rotation retainer assembly.
FIG. 2 illustrates a prior art die member and direction of travel into the prior art stud and anti-rotation retainer assembly.
FIG. 3 illustrates the inventive die member and direction of travel into the stud and anti-rotation retainer assembly of the present invention; is a side view of a flange bolt of this invention with an anti-rotation retainer assembled on the bolt head.
Figure 4:
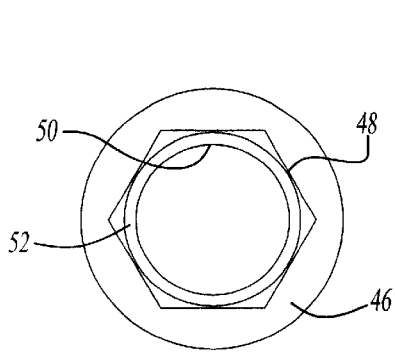
FIG. 4 is an end view of the flange bolt shown in FIG. 3.
Figure 5:
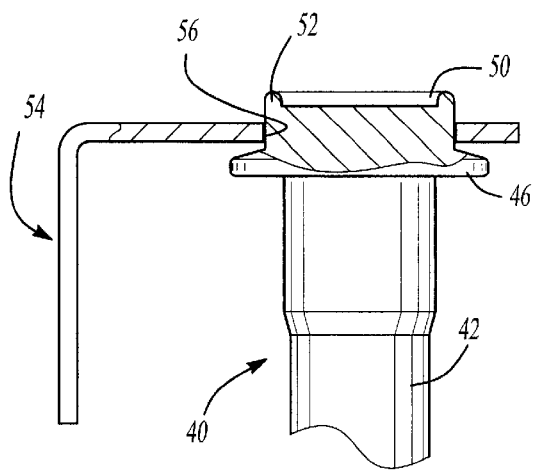
FIG. 5 is a side view of a flange bolt and retainer member of this invention prior to being formed by the method of this invention.

FIGS. 3, 4, and 5 illustrate the rod and plate assembly of this invention prior to securement of the plate to the rod in the form of an anti-rotation stud similar to the anti-rotation stud shown in FIG. 1. As will be understood by those skilled in this art, however, the method of securing a plate to a rod of this invention may be utilized with any conventional rod, preferably including a flange, and any conventional flange head bolt to secure a plate to the rod, including the anti-rotation retainer or flag shown at 54. Thus, the stud or bolt 40 shown in FIGS. 3, 4, and 5 includes a shank portion 42, which may be threaded as shown at 44, a radial flange portion 46 and an integral head portion 48, which is preferably polygonal in this embodiment to prevent rotation of the anti-rotation retainer or flag 54 relative to the bolt 40, however, as described below, other shapes may also be utilized. The head further includes a recess or pocket 50 which, in the disclosed embodiment, is cylindrical, but may take other forms including a polygonal recess which is concentric with the polygonal external surface of the head portion 48. The recess 50 in the end of the head portion 48 thus defines an annular wall 52 which projects from the head portion 48.

The anti-rotation retainer or flag 54 includes an opening 56 which is configured to receive the head portion 48 and is thus preferably hexagonal. As described above in regard to FIG. 1, the anti-rotation retainer 54 may take various forms depending upon the application. The method of this invention thus includes forming an annular integral projection or wall 52 on the end of the rod prior to installation of the anti-rotation retainer 54 and assembling the anti-rotation retainer 54 on the rod by inserting the annular projection 52 through the opening 56 in the end of the rod.

Figure 6:
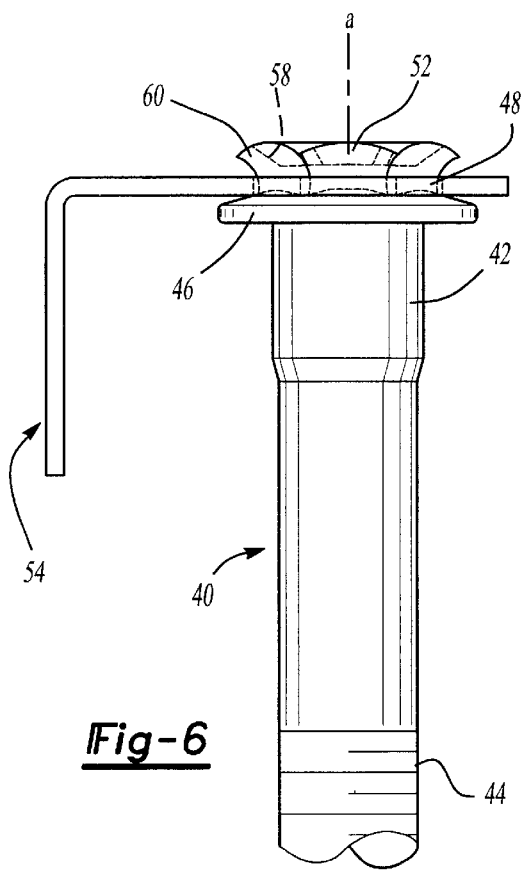
FIG. 6 is a side view of a flange bolt and retainer member of this invention formed by the method of this invention.
Figure 7:
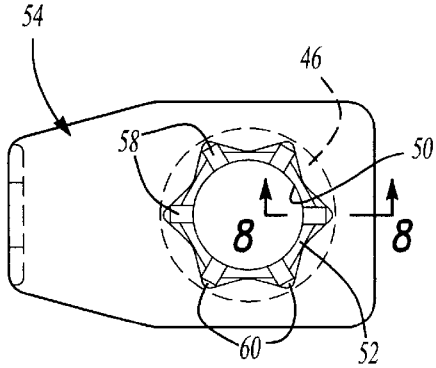
FIG. 7 is a top view of FIG. 6.
Figure 8:
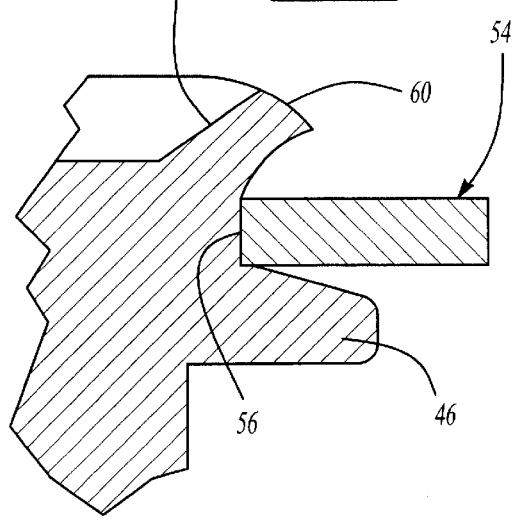
FIG. 8 is a exploded view of the flange through section 8—8 in FIG. 7.

FIGS. 6, 7, and 8 illustrate the bolt and plate assembly following securement of the plate to the bolt head. As best shown in FIG. 7, the annular projection 52 is deformed radially outwardly at 58 at spaced locations forming radial projections 60 which overlie the plate 54 and the portion adjacent the plate contacts the plate as shown in FIG. 8. In the most preferred embodiment shown in FIGS. 6, 7, and 8 and discussed further hereinbelow, the radial portions 60 extend at an acute angle relative to the axis "a" of the bolt, such that the malleable metal easily flows radially during deformation of the annular wall 52. As will be understood, the annular wall or projection 52 can be deformed radially, rather than at an angle; however, the force required to deform the annular wall radially is significantly greater than the force required to deform the annular wall or projection at an angle as shown. It has also been found that in the most preferred embodiment of the bolt and plate assembly of this invention, the annular wall or projection 52 is deformed at the corner portions of the polygonal wall forming a more secure assembly.

The resultant headed bolt and plate assembly shown in FIGS. 6 and 7 therefore solves the problems associated with the prior method of staking the outer corners of the polygonal head as shown in FIG. 1. First, the frangible staked corners 34 shown in FIG. 1 are eliminated, resulting in a much more robust assembly. Actual testing has indicated that the pull-off force required to remove the plate 54 from the bolt 40 is actually greater than the strength of the anti-rotation retainer in many applications. Therefore, the radial projections 60 are not subject to fracture and the anti-rotation retainer 54 therefore does not fall off the bolt. Further, the forming operation is less press sensitive, essentially eliminating scrap. Further, the length of the head portion 48 may be reduced as will be understood by comparing the length of the head portion 28 shown in FIG. 2 with the length of the head portion 48 shown in FIG. 3. This results in a reduction of the weight of the overall assembly, and less material usage which is very important in mass production and automotive applications. Further, because the axial length of the head is reduced, the stroke of the press deforming the annular projection is reduced, resulting in improved cycle time and reduced manufacturing costs.

FIGS. 9–11 illustrate a suitable die member 62 which may be used to secure a plate, such as the anti-rotation retainer 60, to the head portion 48 of the flange bolt 40 shown in FIGS. 2 and 3. The die member 62 is supported by a tool shaft 63. The die member 62 includes a plurality of spaced angled die surfaces 64 which in combination define a cone of revolution. The central portion 66 is received in the recess or pocket 50 in the end of the head portion 48 and the die surfaces 64 are driven against the inside surface of the corner portions during radial deformation of the annular projection or wall 52 forming the radially deformed projection 60 shown in FIGS. 5 and 6 described above.

FIGS. 10–11 illustrate the method of this invention, which includes forming an annular projection or wall 52 on the end of the headed bolt 40. A plate, such as an anti-rotation retainer 54, is then assembled on the bolt head portion 48 by inserting the annular projection 52 on the bolt head through an opening in the plate configured to receive the bolt head as shown in FIG. 10. In the preferred embodiment, the bolt head is polygonal, as described above, and the opening 56 through the plate 54 is also polygonal to prevent rotation of the plate on the bolt following assembly. The die member 62 is then located over the assembly in a die press (not shown). The die member or punch 62 is then driven toward the head portion 48 of the bolt as shown in FIG. 11, wherein the inclined die surfaces 64, best shown in FIGS. 3 and 9, deform the corner portions of the annular wall or projection 52 as shown in FIG. 11 and FIGS. 6 and 7, described above. As best shown in FIG. 5, the resultant bolt and plate assembly is star-shaped in plan view as best shown in FIG. 5.

Figure 12:
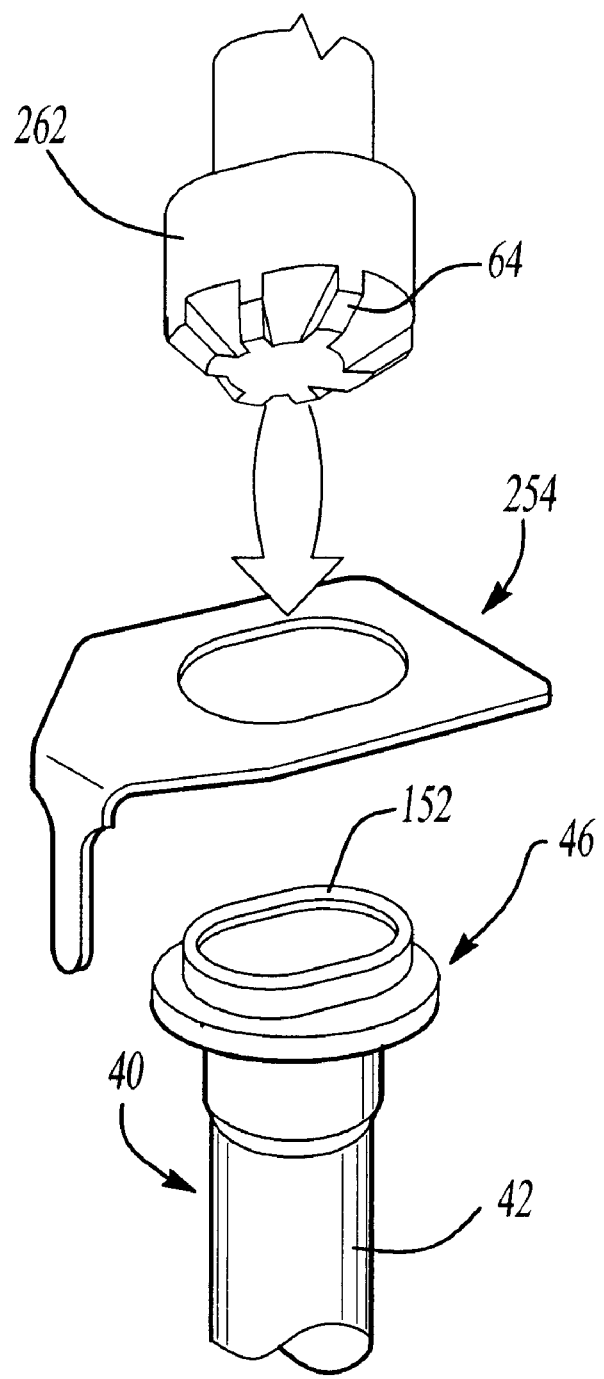
FIG. 12 is a perspective view of alternative embodiment of the present invention.

Having described the preferred embodiments of the plate and rod assembly and method of forming this assembly of this invention, it will be understood that various modifications may be made within the purview of the appended claims. For example, FIG. 12 shows a further alternative die member 262 having an oval cross-section. The oval die member 262 is received by an oval wall 252 having a oval cross-section and is inserted in a oval aperture in the flag 154. In alternative embodiments, the die member 162, 262 deforms the wall 152, 252 radially outward with the spaced angled die surfaces 64.

Although this invention has particular advantages in securing an anti-rotation retainer to a flange head bolt as disclosed in this application, the method and resultant plate and rod assembly may be used in many other applications as described above. Further, the metal selected for the bolt will depend upon the particular application. As will be understood, however, the bolt should be formed of a malleable metal, such as SAE 1020 to 1035 steel. Further, the depth of the recess or pocket 50 will depend upon the thickness of the retainer, plate, or flag. However, testing has indicated that a suitable depth for the recess 50 is between 0.020 and 0.030 inches or above the surface of the retainer, plate, or flag when it is located on the bolt head.

What is claimed is:

1. A method of securing a plate to a malleable metal rod, comprising the following steps:

forming an integral noncircular annular projection on one end of said malleable metal rod;

forming a noncircular opening through said plate configured to receive said integral noncircular annular projection of said malleable metal rod;

receiving said integral noncircular annular projection of said rod through said noncircular opening through said plate;

driving a die member against said integral noncircular annular projection of said malleable metal rod, said die member having a plurality of spaced radial projections and said radial projections deforming an inside surface of said integral noncircular annular projection radially outwardly at a plurality of spaced locations forming a plurality of spaced radially outward projecting portions integral with a remainder of said integral noncircular annular projection of said malleable metal rod, said radially outward projections overlying and contacting said plate at a plurality of spaced locations, permanently attaching said rod and preventing rotation of said plate relative to said rod.

2. The method of securing a plate to a malleable metal rod as defined in claim 1, wherein said integral noncircular annular projection includes a polygonal outer surface having a plurality of planar sides intersecting at corner portions, wherein said method includes driving said radial projections of said die member against said inside surface at said corner portions, deforming said inside surface of said corner portions radially outwardly at spaced locations, forming said plurality of spaced outwardly projecting portions integral with said planar sides.

3. The method of securing a plate to a malleable metal rod, as defined in claim 1, wherein said spaced radial projections are inclined radially outwardly from an axis of said die member defining a cone of revolution, wherein said method includes deforming said integral noncircular annular projection of said rod, forming a plurality of spaced arcuate radially outwardly projections integral with said remainder of said integral noncircular annular projection.

4. The method of securing a plate to a malleable metal rod as defined in claim 3, wherein said integral noncircular annular projection of said malleable metal rod includes a polygonal outer surface including a plurality of planar faces intersecting at corner portions and said die member having the same number of spaced inclined radial projections as said corner portions, wherein said method includes driving said inclined radial projections against said inside surface at said corner portions, forming said plurality of spaced arcuate outwardly projecting portions integral with said remainder of said integral noncircular annular projection.

5. A method of securing a plate to a malleable metal rod, comprising the following steps:

forming an integral annular projection having a polygonal and outer surface on one end of said malleable metal rod including generally planar side faces intersecting at corner portions;

forming a polygonal opening through said plate configured to receive said integral polygonal outer surface of said annular projection on said malleable metal rod;

receiving said integral polygonal annular projection of said rod through said polygonal opening through said plate;

driving a die member against said integral annular projection of said malleable metal rod having a plurality of circumferentially spaced radial projections deforming an inside surface of said corner portions of said integral annular projection and forming a plurality of spaced outwardly projecting portions at said corner portions integral with said generally planar faces, permanently securing said plate to said rod and preventing rotation of said plate relative to said rod.

6. The method of securing a plate to a malleable metal rod as defined in claim 5, wherein said plurality of spaced radial projections are inclined outwardly from an axis of said die member defining a cone of revolution and said method includes driving said inclined radial projections of said die member against said inside surfaces of said integral annular projection at said corner portions, deforming said corner portions radially outwardly forming spaced arcuate radial outwardly projections at corner portions integral with said planar faces of said integral polygonal annular projection of said malleable metal rod.

\* \* \* \* \*